T. D. JONES.
VEHICLE AXLE.
APPLICATION FILED JULY 22, 1908.
908,572.
Patented Jan. 5, 1909.
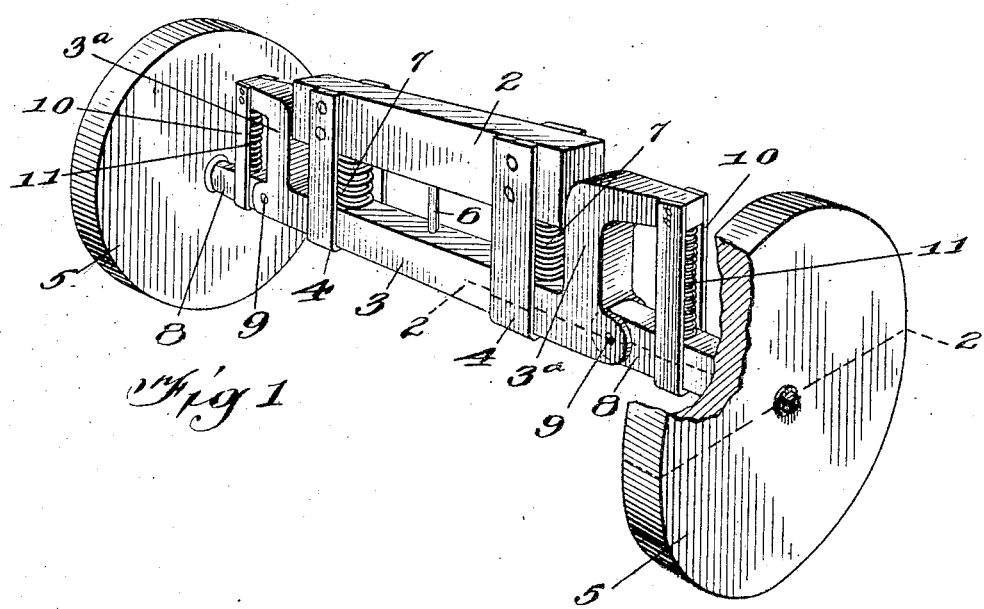
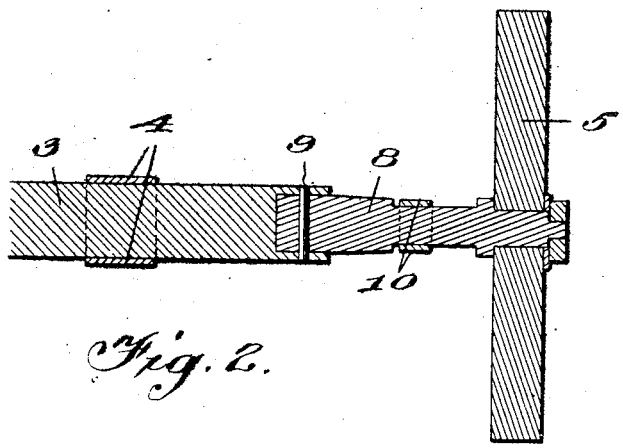
Witnesses
Inventor
Thomas D. Jones;
By Geo. E. Tew
Attorney

UNITED STATES PATENT OFFICE.

THOMAS D. JONES, OF CLEVELAND, OHIO.

VEHICLE-AXLE.

No. 908,572.　　　Specification of Letters Patent.　　　Patented Jan. 5, 1909.

Application filed July 22, 1908. Serial No. 444,782.

*To all whom it may concern:*

Be it known that I, THOMAS D. JONES, citizen of the United States, residing at Cleveland, in the county of Cuyahoga and State of Ohio, have invented certain new and useful Improvements in Vehicle-Axles, of which the following is a specification.

This invention relates to axles for vehicles, and has for its object to provide an improved axle or supporting structure which will serve the purpose or function of a pneumatic or other resilient tire, the wheels being solid or ordinary wheels, the axle being made in sections hinged or pivoted together to bend or yield vertically, springs being interposed to cushion the action.

The invention is illustrated in the accompanying drawings in which—

Figure 1 is a perspective view; Fig. 2 is a horizontal section on the line 2—2 of Fig. 1.

Referring specifically to the drawings, 2 indicates a bolster on which the wagon or other body is mounted, and this has at each end a U-shaped hanger or retainer 4 in or between which the middle section 3 of the axle extends. A bolt or pin 6 projects downwardly from the bolster and works in a hole in the axle section and prevents lateral or endwise movement thereof. Coiled springs 7 are located in position between the bolster and the axle, preferably within the hangers, where they are retained by any suitable means.

Each end of the axle section 3 is provided with an upwardly extending bent arm or elbow 3ª which is rigid with said axle section, the upper branch of the arm extending outwardly toward the wheels. Each end of the section 3 is also provided with a stub axle section 8 which is hinged to the end of the middle section 3 by means of a stout pin 9. Each stub section 8 carries one of the wheels 5. A U-shaped retainer or hanger 10 is fixed to the outer end of the elbow 3ª and extends around the stub section 8 and assists in holding the same in proper position. A spring 11, of sufficient strength to stand the pressure, is located between the outer end of the elbow 3ª and the stub section 8, preferably in the space between the sides of the hanger 10, and this spring serves to cushion the vibration or movement of the stub axle section on the hinge 9. The wheels may be of any suitable or desired construction. Solid wooden wheels can be used.

In use, the springs 7 and 11 will yield under shock or load and thereby serve the purpose of the invention.

The drawings illustrate the invention in a plain or simple form. Obviously the parts may be made as ornamental as desired, and various other modifications may be made within the scope of the present invention.

I claim:

A support for a vehicle body consisting of an axle comprising a middle section having elbows at the ends thereof projecting upwardly and outwardly, the outer ends of the elbows being provided with depending hangers, outer sections hinged to the ends of the middle sections, and extending through said hangers, springs between the outer ends of the elbows and the outer sections, a bolster located between the elbows, and supporting springs between the bolster and the middle axle section.

In testimony whereof, I affix my signature in presence of two witnesses.

THOMAS D. JONES.

Witnesses:
　BERT McCURLEY,
　CLAYTON L. BALDWIN.